United States Patent [19]

Müntener

[11] Patent Number: 5,351,609
[45] Date of Patent: Oct. 4, 1994

[54] CONCHING MACHINE

[75] Inventor: Kurt Müntener, Bad Salzuflen, Fed. Rep. of Germany

[73] Assignee: Richard Frisse GmbH Maschinenfabrik, Bad Salzuflen, Fed. Rep. of Germany

[21] Appl. No.: 127,284

[22] Filed: Sep. 27, 1993

Related U.S. Application Data

[63] Continuation of Ser. No. 869,774, Apr. 16, 1992, abandoned.

[30] Foreign Application Priority Data

May 2, 1991 [CH] Switzerland ............ 01 317/91-4

[51] Int. Cl.⁵ .................. A23G 1/00; A23G 1/10; A23G 1/16; B01F 7/02
[52] U.S. Cl. .......................... 99/485; 99/348; 99/472; 366/155; 366/196; 366/297; 366/301
[58] Field of Search ................ 99/348, 485, 452, 472, 99/456–459, 460–462; 426/519, 660; 366/83–86, 149, 290–291, 297–301, 194–196, 154, 155

[56] References Cited

U.S. PATENT DOCUMENTS

| | | | |
|---|---|---|---|
| 3,216,706 | 11/1965 | Loomans | 366/85 |
| 3,570,569 | 3/1971 | Hartley et al. | 366/196 |
| 3,634,106 | 1/1972 | Organ et al. | 99/485 |
| 3,638,920 | 2/1972 | Davis | 366/298 |
| 3,663,231 | 5/1972 | Tourell | 99/485 |
| 3,682,086 | 8/1972 | Ocker | 99/485 |
| 4,630,930 | 12/1986 | Seiling | 366/194 |
| 4,679,498 | 7/1987 | Chaveron et al. | 366/85 |
| 4,733,607 | 3/1988 | Star et al. | 99/348 |
| 5,083,506 | 1/1992 | Horn et al. | 366/297 |
| 5,156,867 | 10/1992 | Leuthold et al. | 99/348 |

FOREIGN PATENT DOCUMENTS

| | | |
|---|---|---|
| 0063171 | 10/1982 | European Pat. Off. . |
| 0140729 | 5/1985 | European Pat. Off. . |
| 0262300 | 4/1988 | European Pat. Off. . |
| 0217895 | 7/1989 | European Pat. Off. . |
| 654877 | 12/1937 | Fed. Rep. of Germany . |
| 1189368 | 3/1965 | Fed. Rep. of Germany . |
| 1782585 | 10/1971 | Fed. Rep. of Germany . |
| 3626732 | 2/1988 | Fed. Rep. of Germany . |
| 3918813 | 6/1988 | Fed. Rep. of Germany . |
| 4021305 | 1/1992 | Fed. Rep. of Germany . |
| 1567475 | 5/1969 | France . |
| 2013621 | 4/1970 | France . |
| 2527938 | 12/1983 | France . |
| 394779 | 12/1965 | Switzerland . |

Primary Examiner—Timothy F. Simone
Attorney, Agent, or Firm—Martin A. Farber

[57] ABSTRACT

A continuously operating conching machine (1) according to the invention is divided into a plurality of compartments (10–12) divided by at least one partition wall (8), transfer of the material from one compartment (10–12) to the next being effected via at least one opening (e.g. 16) in the particular partition wall. However, with a conching machine continuously processing the chocolate paste, it is possible expediently to carry out a method according to the invention, in which additives are added only batchwise to the essentially continuously processed chocolate paste, in order to permit more accurate metering.

10 Claims, 5 Drawing Sheets

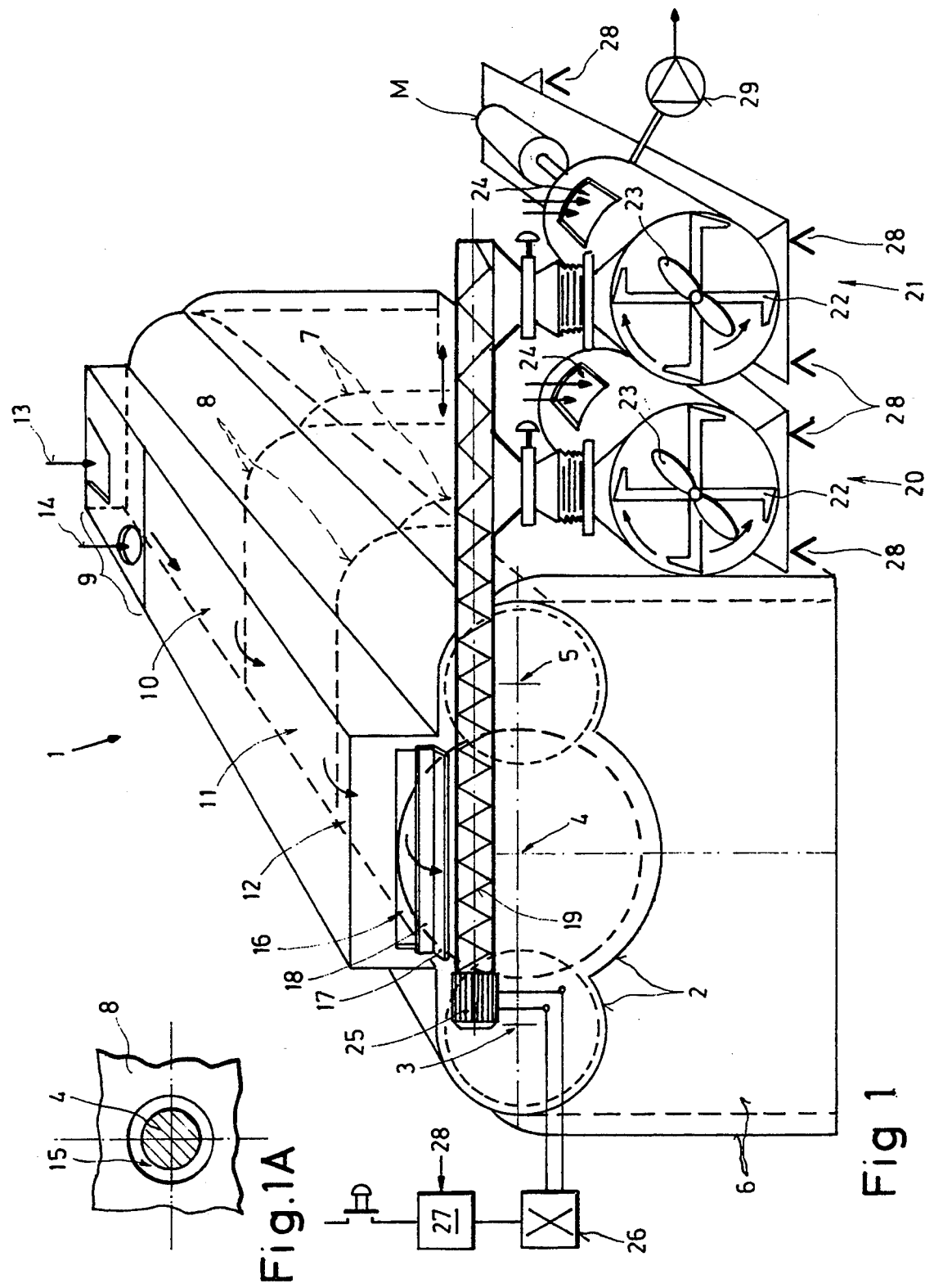

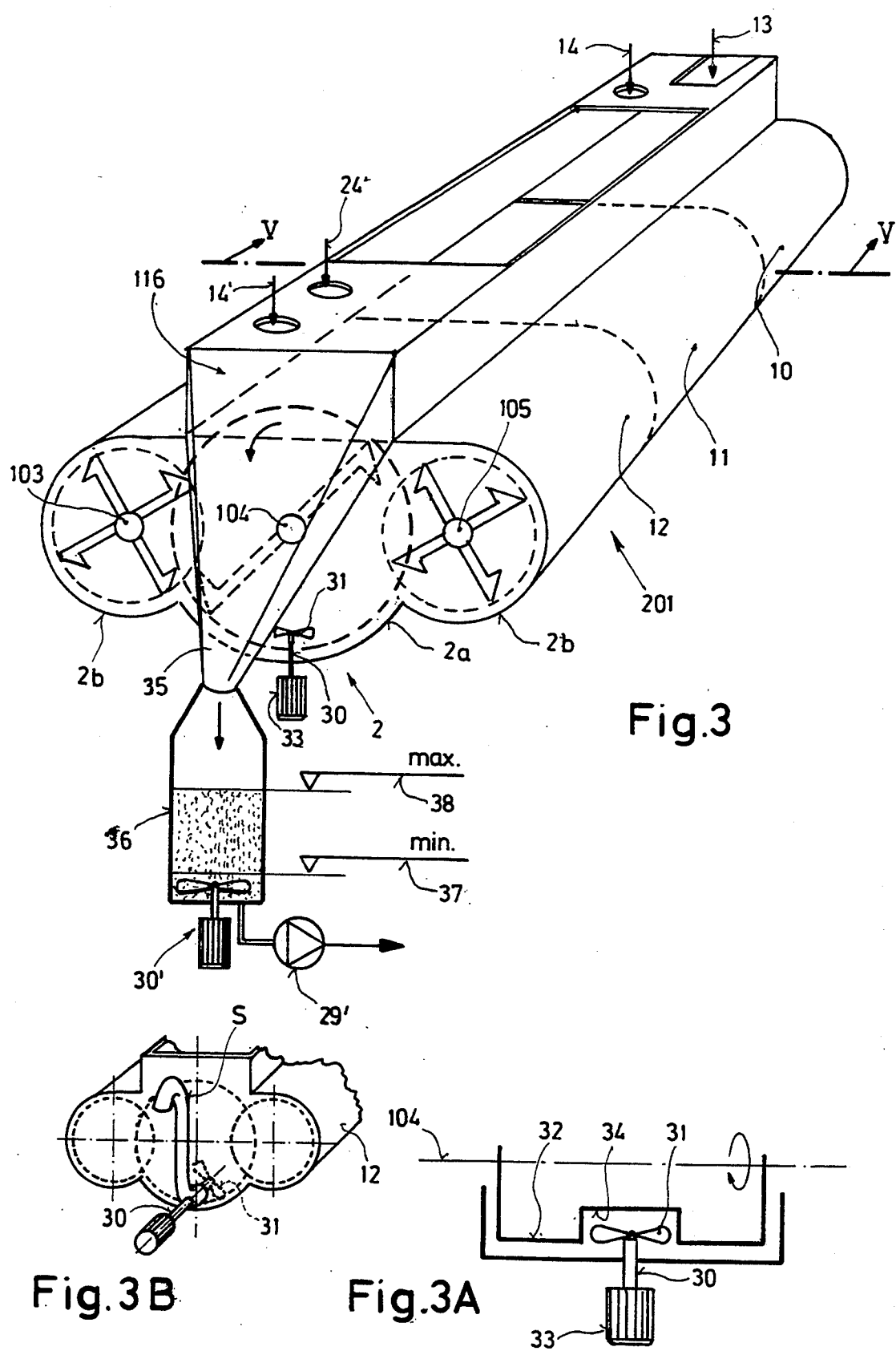

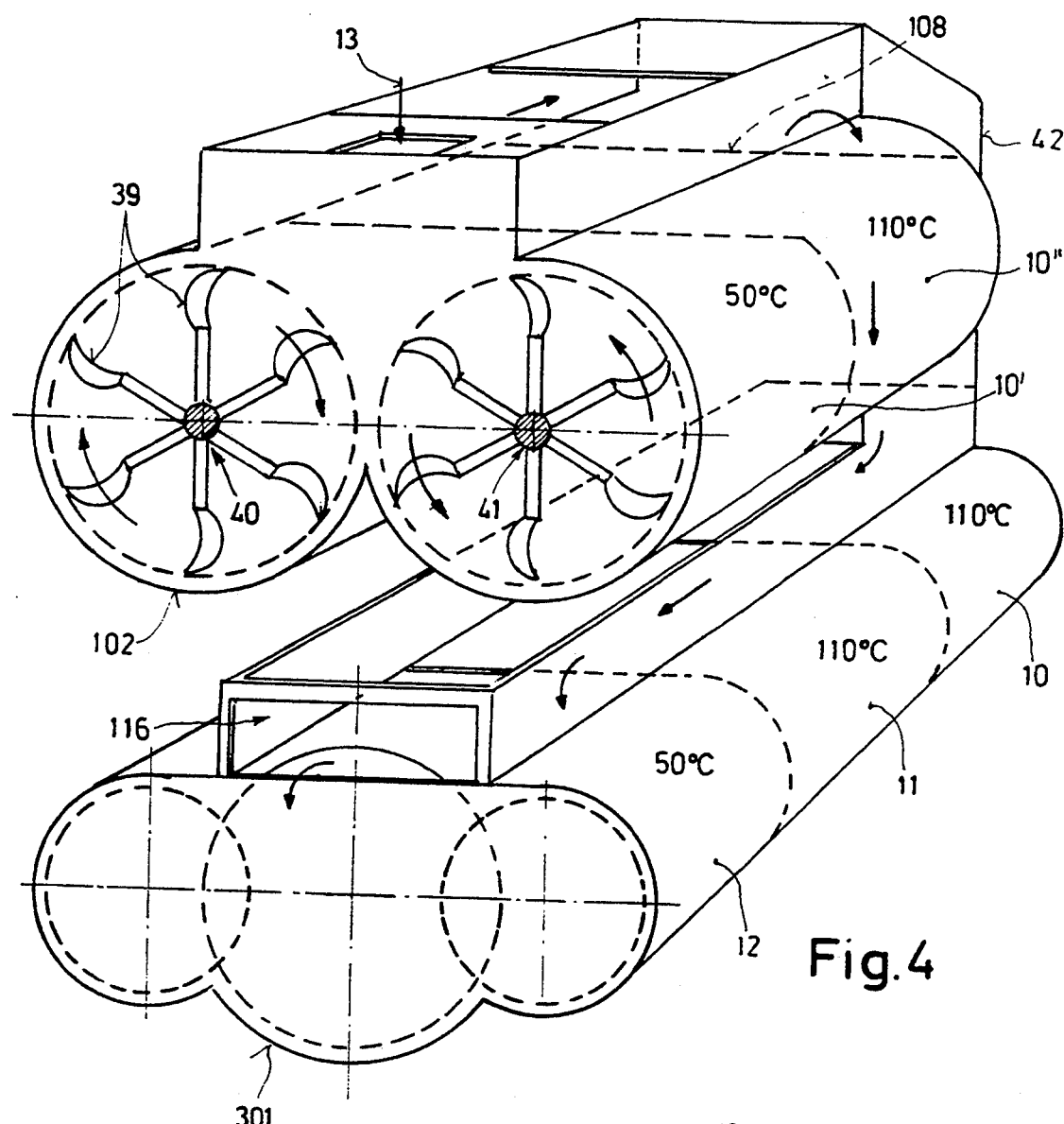
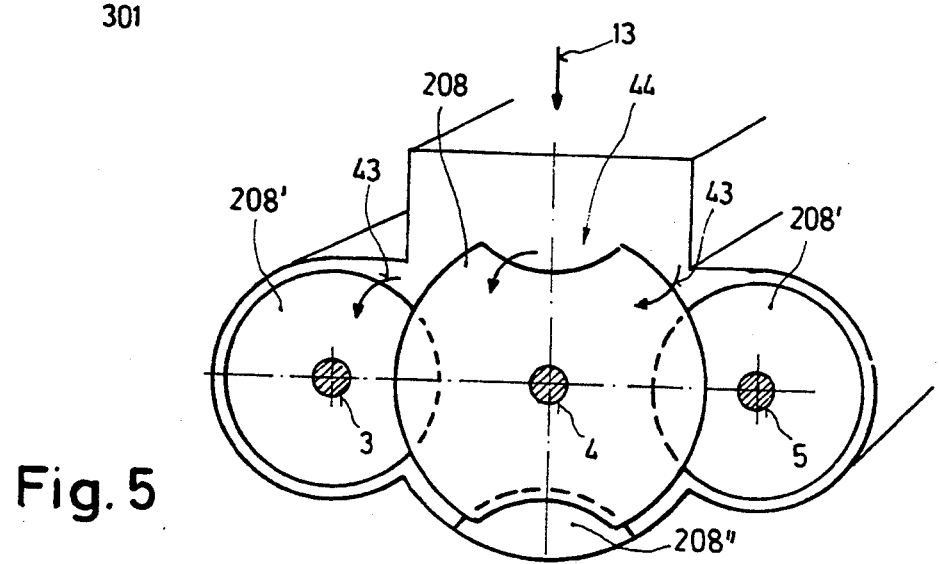

CONCHING MACHINE

RELATED APPLICATION

This application is a continuation of my co-pending application Ser. No. 07/869,774 filed Apr. 16, 1992, now abandoned.

FIELD AND BACKGROUND OF THE INVENTION

The invention relates to a conching machine.

A conching machine is disclosed in DE-A-39 18 813. However, such an arrangement occupies a relatively large amount of space, quite apart from the fact that the conveying properties of a screw of the known conching machine, which screw is arranged on an overflow opening, depend to a very great extent on the consistency of the chocolate paste. However, this in turn influences the reproducibility of a chocolate formulation in a disadvantageous manner since certain additives are added in a relatively small amount in an exact ratio to the relatively large amount of chocolate paste, only in the course of the conching process or subsequently.

SUMMARY OF THE INVENTION

It is the object of the invention to design a continuous conching machine so that further conveying is substantially independent of the consistency of the paste or that exact metering of the additives, such as lecithin, cocoa butter or the like, is possible.

The embodiment according to claim 1 ensures satisfactory transfer of the paste from one compartment to the other since feeding takes place continuously and overflow therefore inevitably occurs, a residence time determined by the feed rate and the compartment volume being guaranteed. However, a particularly valuable advantage is the compact and space-saving housing, which on the one hand avoids unnecessary further conveying over greater or lesser distances and therefore also constitutes an improvement from the point of view of hygiene, especially since processing takes place in a common housing, and on the other hand also reduces costs in that, instead of two or three complete conching machines together with the housing, only a single conch housing need be provided.

The embodiment according to claim 4 is particularly advantageous because such disks can also readily be retrofitted and therefore make it possible readily to convert a conventional conching machine subsequently into a conching machine according to the invention and vice versa, which reduces the production costs, shortens the delivery times and simplifies stockkeeping.

A homogeneous consistency of the chocolate paste and hence advantageous preconditions for the addition of additives is, however, also ensured by the embodiment according to claim 6, which as such, but very particularly in conjunction with an embodiment according to claim 1, is of inventive significance. In fact, the shearing shaft ensures on the one hand thorough mixing in the region of the output opening and also—because of its shearing effect—liquefaction which is as great as possible and which in turn improves the possibilities with regard to good accuracy of metering.

For solving the relevant problem a more accurate determination of weight is permitted by the batchwise addition of the additives, which are to be weighed in accurately and to be calculated relative to a certain amount of chocolate paste, so that the inaccuracy of continuous balances are dispensed with. It is not absolutely necessary to carry out the batchwise addition in the conching machine for the chocolate paste continuously processed therein.

For batchwise weighing of the chocolate paste, a tube balance is particularly suitable. Tube balances are disclosed in, for example, EP-B-0 217 895. In contrast to the cylindrical balance described there, however, in the applicant's experiments it has proven particularly advantageous, for tacky or pasty materials very generally, in particular for chocolate paste, if such a tube balance diverges in a downward direction because as a result residues in the weighing container are more easily avoided and the walls inclined obliquely downward facilitate detachment of the paste from them. This embodiment of a balance is therefore of general inventive significance.

BRIEF DESCRIPTION OF THE DRAWINGS

Further details of the invention are evident from the following description of embodiments shown schematically in the drawing.

FIG. 1 shows an oblique view of a conching machine according to the invention, of which FIG. 1A and 1B show details, i.e. FIG. 1A shows the passage of a rotor shaft through a partition wall between two compartments, and FIG. 1B shows a side view in the direction of the screw axis in the region of the last overflow;

FIG. 2 shows an embodiment of FIG. 1, with reference to which it is intended to describe a further embodiment of the method according to the invention;

FIG. 3 shows a third embodiment, of which

FIG. 3A is a side view of the shearing shaft and of the recess in the tools of the rotor shaft, which recess is provided in the region of said shaft; and FIG. 3B an alternative embodiment to FIG. 3;

FIG. 4 shows a fourth embodiment of a conching machine according to the invention;

FIG. 5 shows a section along the line V—V of FIG. 3 in order to illustrate a particularly preferred version of the partition wall.

DESCRIPTION OF THE PREFERRED EMBODIMENTS

Figures 1B, 2:
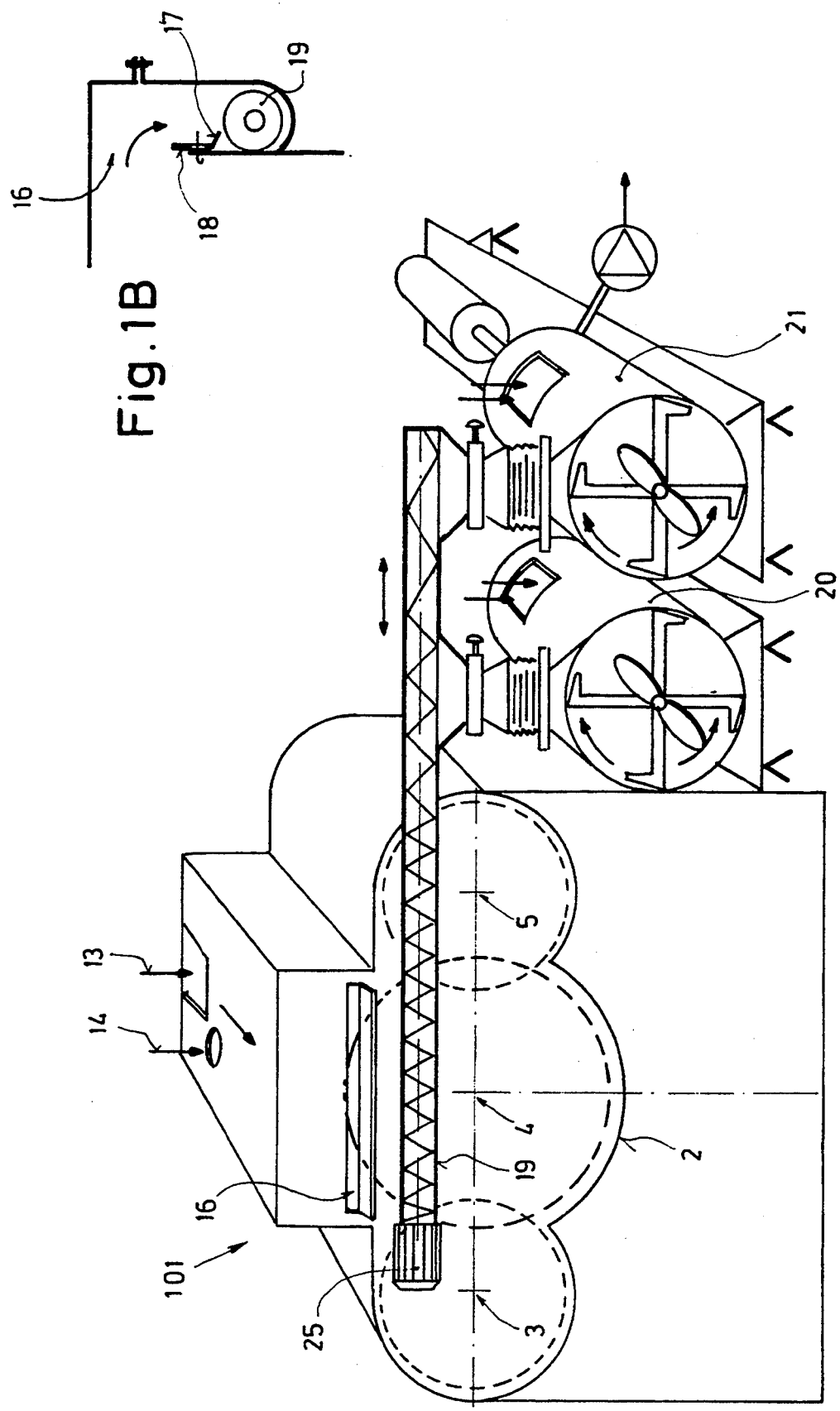

A conching machine 1 possesses, in a known manner, a trough 2 for holding the chocolate paste to be processed, in which trough three rotor shafts 3, 4 and 5 are rotatably mounted, such shafts being merely indicated. These rotor shafts carry, in a known manner, trituration or paste-producing tools with which, if required, mixing tools are coordinated. The embodiment and the mode of action of these tools form part of the prior art and are described in, for example, DE-A-36 26 732, where it is also stated that it is possible to manage with fewer than three rotor shafts.

A cooling jacket 6 which is divided by partition walls 7 into three independent sections or cooling circulations, each of which may be separately controllable, in particular may each have a temperature control loop, is provided on the outside of the trough 2. Analogously to the division of the cooling jacket 6, the trough 2, too, is divided by partition walls 8 into three successive compartments of which, for example, the compartment 10 closest to a filling region 9 is provided as a dry conching section, the adjacent compartment 11 is provided for the processing of the mass which has become plastic and pasty, and, if required, a third section is provided for processing the already liquefied material. However, it should be mentioned that, if required, dry conching may be carried out in a separate conching machine, that will be explained below.

The filling region 9 may in principle be completely open, and if necessary vertical lamellae prevent splashing out, as is usual in this technique. However, it is also possible to provide one input opening 13 for the material to be conched (cocoa or chocolate paste) and one opening 14 for adding fat (cocoa butter). This addition takes place in both cases virtually continuously, and, when a weighing system according to FIG. 6 discussed below is used, continuous addition should also be understood as meaning addition in small amounts following in relatively rapid succession. Regarding the addition of cocoa butter, which is a conventional additive in chocolate production, only a basic amount is added via the input opening 14 and is subsequently supplemented to give the full formulation amount.

As soon as these materials have been introduced into the first compartment 10 and the rotor shaft 3-5 has been set into motion, the compartment 10 is filled (and the chocolate processed therein) until the contents of compartment 10 reaches the height of the upper edge of the partition wall 8 bordering the compartment 10. Further replenishing via the openings 13 and 14 now results in the material which has already reached the partition wall 8 and has become pasty and plastic exceeding the upper edge of this partition wall 8 and flowing into the next compartment 11. There, further processing is carried out in an analogous manner until here too the contents of this compartment 11 reach the level of the partition wall 8 which forms the partition with respect to the compartment 12 and flow into this last compartment 12. To avoid back-mixing, it is advantageous if the partition wall between successive compartments 11 or 12, or its upper edge, is slightly lower than that between preceding compartments 10 and 11. However, back-mixing can also be avoided by corresponding design of the rotor tools in such a manner that these tools cause the paste to flow in the direction of the subsequent compartment, for example by designing them as spiral or helical coils with transport in this direction.

However, the upper edge of the particular partition wall need not be the only connection between adjacent compartments. In fact, the design may be considerably simplified if the rotor shafts, such as the shaft 4 shown in section in FIG. 1A, pass unsealed through the partition wall 8, so that an annular gap 15 remains around the shaft 4 and also permits the passage of chocolate paste. The problem of mounting and of keeping clean such bearings on the particular partition wall 8 thus does not arise.

It is possible to provide, at the end of the conching machine 1, an overflow opening 16 via which the chocolate paste runs off, for example via a discharge sheet 17, for further conveying. As already noted in the case of the partition wall 8 between the compartments 11 and 12, the level of the overflow opening 16 may also be slightly lower than the overflow edge of the preceding partition wall 8. FIG. 1B shows the actual conditions in this region in more detail. The discharge sheet 17, which is not absolutely necessary, is expediently connected to a slide 18 which is vertically adjustable in height for setting the required level (and hence the residence time inside the conch compartment). Similar adjustment constructions can also be provided on the partition walls 8.

It is evident that in this case too—in contrast to the prior art—no forced transport takes place at the particular ideal level but further transport from the particular compartment is left to the natural equilibration based on the principle of communicating vessels. This permits greater freedom of design on the one hand but on the other hand also avoids problems relating to conveying and maintaining cleanliness, which problems would arise with the arrangement of a conveyor screw 19 (or another conveying means) directly at the opening 16.

It is advantageous if only a part of the additives is added continuously via the input opening 14. The remainder required for formulation can—if necessary after determining the lacking amount—be admixed in two downstream mixing containers 20, 21. These mixing containers 20, 21 are, for example, equipped with relatively high-speed knife shafts 22 or with mixing blades 23 rotating in opposite directions, which latter are caused to rotate by a mixer shaft driven concentrically in a hollow shaft. Since the two mixing containers 20, 21 are in the form of batch mixers (to permit batchwise—and therefore more accurate—addition of the additives), and the conching machine 1 is fed continuously, the two (or more) mixing containers 20, 21 are operated alternately. An anchor drive motor M is coordinated with each container. Cocoa butter or lecithin or other additives can be added batchwise via an input opening 24, which may be capable of being closed.

To permit alternate operation of the two mixing containers 20, 21, a reversing mode of the screw 19 is provided, for which purpose its motor 25 is connected to a changeover switch 26 for the direction of rotation. This switch 26 can advantageously be controlled via a program circuit 27. The sequence is, for example, as follows.

First, the container 21 is filled until weight gages 28 indicate that the required batch weight has been reached. Thereafter, the residual material which remains in the tubular housing of the screw 19 in the region between two containers 20, 21 is conveyed back toward the container 20 by a change of direction by means of a signal fed to the program stage 27 and obtained from the gages 28, said container 20 receiving this part of the material so that the screw housing between it and the container 21 is emptied. This generally takes a predetermined time, i.e. this program segment can simply be time-controlled. The direction of rotation is then reversed back to the conveying direction from the conching machine 1 to the container 20, so that the latter can be filled. The time is sufficient to permit mixing of the additives in a container 21 to have been carried out in between, so that this container 21 is then filled again without a change in the direction of rotation of screw 19, after the preceding contents of container 21 have been discharged with the aid of a pump 29.

The embodiment according to FIG. 2 serves to illustrate the fact that the invention can also be carried out independently whether or not the conching machine is divided into individual components. Thus, the conching machine 101 can also be operated as a continuous conching machine, as in the case of conching machine 1, and batchwise addition of the additives via the batch mixers 20 and 21 still takes place, it being possible to preset two modes of operation. Either a procedure is adopted in which a separate conching machine corresponds to each compartment 10-12 of FIG. 1, for example dry conching taking place in the first one and the plastic pasty material being processed in the second one and liquid conching being effected in the final conching machine, or the conching machine 101 is operated so that the tools of the rotor shafts 3-5 ensure slight axial movement of the chocolate paste, and individual zones—corresponding to the compartments 10-12—thus form inside the conching machine 101, the rotor shafts being provided, expediently only in the required transition region from one zone to the other, with tools imparting an axial movement.

From this description it is evident that different variants are possible, such as, for example, transverse flow through a conching machine, transverse to the longitudinal axes of the curved surfaces of trough 2, or the use of combinations of the above-mentioned different embodiments. In any case, the disadvantages which previously made continuous conching merely a theoretical proposal from the technical literature, which was scarcely used in practice, can be avoided by such a combination of batchwise addition of the additives with otherwise continuous processing.

In the case of FIG. 3, a conching machine 201 similar to the conching machine 1 provided, said conching machine 201 in turn being divided into individual compartments 10-12, so that further description in this respect is unnecessary. In the case of very accurate weighing, in particular in the case of weighing as described with reference to FIG. 6 to the weighing of the chocolate paste by way of example, continuous addition of the additives may also take place. However, addition in portions is carried out here too, in that, in addition to the continuous filling of material to be conched via the opening 13, first a basic amount of additive, such as cocoa butter, is added via the input 14 and is thus already present in the first compartment 10. The remainder of the additives is added continuously at a later time during the processing, for example in compartment 12, via input openings 14' and 24' (corresponding to an addition of a residual amount of cocoa butter at 14' and of lecithin at 24'), and it is already clear here why the method according to the invention, with batchwise addition of the additive described with reference to FIG. 1 and 2, was not directly obvious. In this case, a sudden addition of a batch of additives in the continuous flow of the chocolate paste inside the conching machine 201 would merely lead to a falsification of the formulation, namely to an inhomogeneous distribution of the additives, at least unless additional mixing procedures were carried out.

In any case, only the amount which is still lacking for completion of the formulation is of course added at 14' and 24', which lacking amount can be determined, for example, by taking samples from the compartment 11 (automatically by means of a sampler which expediently forms part of a control loop controlling the addition at 14' and 24', or simply manually).

The conching machine 201 also differs from the conching machines 1 and 101 previously described in that the final compartment 12 expediently has tools other than those in the two first compartments 10 and 11. While in fact these latter ones have the conventional trituration and paste-producing tools or, if required, mixing tools, in trough 2 only the middle vessel 2a, i.e. the rotor shaft 104, is provided with the conventional tools, whereas the outer vessels 2b or their rotor shafts 103 and 105 have tools arranged in the form of a cross, corresponding to a multiple arrangement of tools, in oder to be able to carry out more intensive processing in the liquid phase, which in principle requires less energy.

Although such a tool arrangement could also be coordinated with the middle vessel 2a, it has proven advantageous to provide there, in the region of the output (wide open 116), at least one shearing shaft 30 which extends transverse to the associated rotor shaft 104, in particular is arranged radially with respect to the vessel 2a, and shearing tools 31, in particular knives. It is quite possible to provide more, for example a second rotor shaft, inside the compartment 12 to be coordinated with the output region, the tools 32 of the rotor shaft 104 which are merely schematically indicated in FIG. 3A having a recess 34 in the region of the shearing shaft 30 driven by means of a motor 33. However, this is not absolutely essential since the knife shaft 30 could also be arranged in an identation in the vessel 2a, which indentation may be connected below to an output opening, if necessary with output regulation, for example via a conveying screw. A preferred arrangement of a shearing tool is shown in FIG. 3B and will be described at the end of this specification.

Here, however, transfer of the chocolate paste which has been conched, at least in the conching machine 201, takes place via an output channel 35 into a buffer container 36, which is likewise to be considered part of the output region and which is therefore expediently also provided with a shearing shaft 30'. Here, further addition of additives can, if necessary, be effected, for example by adding lecithin to the buffer container 36 instead of via the input opening 24'. The buffer container 36 ensures that the downstream pump 29' does not run dry and is therefore expediently provided with at least one level sensor 37 or 38 which controls the operation of the pump 29'. It is also possible merely to provide the minimum level sensor 37 which shuts down the pump 29'when the level sinks below its level, while a time function element switches it on again after a predetermined time constant. It is also possible simply to work with the lever sensor 38 which puts the pump 29' into operation when the level which it senses has been reached (the throughput volume of set pump per unit time being known), whereupon the pump 29' is switched off again by a timer after a predetermined operating time.

FIG. 4 illustrates a particularly gentle method for processing chocolate paste with a conching machine having more than three compartments. A material aerating trough 102 which performs the function of mild dry conching and is therefore provided with carefully scraping tools on its (for example only two) rotor shafts 40, 41 is connected upstream of the conching machine 301 corresponding to the conching machine 1 or 201. This trough 102 may have a single compartment but in this case possesses two compartments 10' and 10" which are connected in series and are upstream of the first compartment 10 of the conching machine 301, transfer from the compartment 10" taking place via an overflow edge of a partition wall, from where the paste falls into a shaft 42 leading to the compartment 10. While the first compartment 10' carries out gentle preparation with an energy input for heating up to about 50°, the material in the compartments 10" to 11 is more intensively processed, for which purpose tools which work more intensively than tools 39 may be provided in compartment 10" itself. Only in the final compartment 12 is the temperature decreased again to about 50°, due to the low resistance of the material which has already become fluid. The addition of the additive can be effected in one of the ways discussed above.

A particularly advantageous form of division into individual compartments is shown in FIG. 5, which corresponds to a section along the line V—V of FIG. 3 but whose concept can in principle be implemented in all embodiments. Rotating partition walls 208 and 208' are provided instead of static partition walls 8 and 108, respectively. In principle, these disks 208, 208' fastened to the rotor shafts 3-5 (they could in principle also be arranged on shafts extending parallel to the rotor shafts, for example running above and below) may be of a circular shape completely identical to the disks 208', since overflow openings 43 are produced in between. To increase the throughput capacity, however, at least one of these disks may be in the form of the partition disk 208 with a rotating opening 44 at its periphery or an opening inside its periphery. Of course, for symmetry reasons it is preferable if the middle rotor shaft 4 (if an uneven number of rotor shafts is provided) is equipped with such a partition disk 208.

The advantage of such a solution consists very evidently in the fact that such disks 208, 208' can also be mounted subsequently on a rotor shaft 3, 4 or 5, so that a conventional conching machine of appropriate length can easily be converted into the conching machine according to the invention, and high stockkeeping costs for different types of conching machines can be avoided. In addition, such disks can be installed easily and at little expense.

Figure 6:
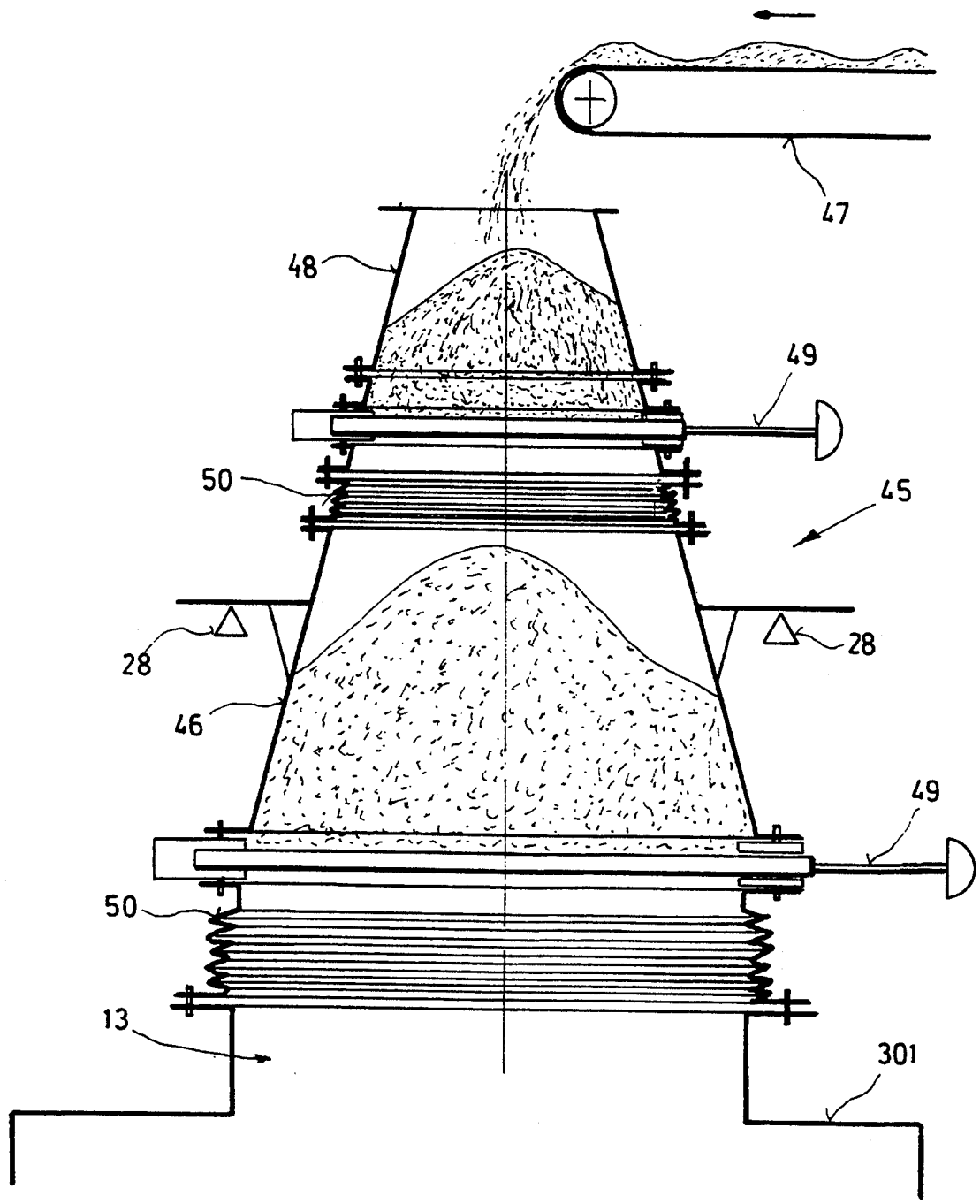
FIG. 6 shows a balance used according to the invention, via the input opening of a conching machine.

Although a conching machine 301 is operated continuously, it can be used for more accurate addition of the chocolate paste in conformity with the formulation if this addition is effected batchwise, and in particular corresponding to FIG. 6, with the result that more accurate weighing can be carried out. This preferred embodiment employs a tube balance 45 which is distinguished from conventional tube balances in that its walls 46 diverge downward. This enables the material, which has a strong tendency to adhere, to be more readily detached from the walls 46 inclined obliquely downward.

A filling via the input opening 13 is effected here quasi-continuously, i.e. relatively small amounts (in relation to the conching machine volume) are emptied from the balance 45 at repeated time intervals in relatively rapid succession. However, since the material, for example arriving from the mill units, is delivered via continuous belt 47, but the balance 45 operates batchwise, a connecting pipe 48 which acts as a buffer container and preferably likewise as a downward-diverging wall is provided. Locks, in particular in the form of slides 49 which can be operated by fluidic means, are arranged above and below the weighing container 45 resting on gages 28, free mobility being ensured between these locks and the weighing container 45, in order to avoid mutual influence. This mobility may be achieved simply by virtue of the fact that the tubes are inserted one into the other, i.e. overlap one another at their ends, without there being any special seal. Preferably, however, bellows 50 which prevent the admission of outside air or of bacteria are provided.

Of course, such a balance 45 can be used, and is advantageous, very generally wherever it is intended to weigh material which tends to adhere. If necessary, it is also possible to provide an automatic means which, at the end of the weighing process, in particular under program control, causes the weighing container 45 to be lifted from the gages 28 and the container 45 to be subsequently vibrated in order to shake the material out of the container 45.

FIG. 3B shows a swan-neck-tube 5. This arrangement prevents that chocolate mass, when running over the partition walls forms a "short-circuit" by floating merely on the surface of the mass below which will then have a longer time of dwell. Such a swan-neck-tube may be provided between respective compartments, but preferably at the end of the conching machine, as shown. While ensuring a predetermined level of chocolate mass within compartment 12, the swan-neck-tube warantees also a good mixing effect, because its entrance orifice is on the bottom side of the compartment 12. Moreover, it is favorable to arrange the shearing tool 31 within the range of this orifice. Suitably, the shearing shaft 30 extends substantially horizontally through the lower section of the swan-neck-tube S.

What is claimed is:

1. A conching machine for treating chocolate paste by kneading and mixing comprising a trough for containing said chocolate paste extending along a longitudinal axis from an input end to an output end, said trough having at least two compartments extending along said longitudinal axis;

an input opening on said input end for inputting said chocolate paste;

an output opening on said output end for outputting said chocolate paste;

at least one partition wall being arranged transversely to said longitudinal axis and dividing said trough into said at least two compartments of said trough, said partition wall comprising at least one passage opening for said chocolate paste, said passage opening being located at a top portion of said at least one partition wall;

at least two rotors with kneading elements, each rotor being arranged within one of said compartments and having a rotational axis substantially parallel to said longitudinal axis; and motor means for driving said rotors;

wherein each of said kneading elements is a conching element configured as a wiper extending to a cylindrical wall of a trough and meeting the cylindrical wall at an angle thereto for introducing a radial movement to chocolate paste relative to the cylindrical wall;

a flow of chocolate paste through said at least one passage opening is dependent on a level of a filling of said trough by inputting chocolate paste via said input opening into said trough; and a conveying of the chocolate paste from one of said compartments to a second of said compartments is independent substantially of the consistency of the paste.

2. Conching machine as claimed in claim 1, wherein said at least one partition wall is arranged substantially orthogonal to said longitudinal axis.

3. Conching machine as claimed in claim 1, wherein said at least one partition wall has an overflow edge arranged at a nominal level for said chocolate paste within the section facing said input end, said overflow edge being arranged to define said at least one passage opening.

4. Conching machine as claimed in claim 1, wherein said rotors extend along said rotational axes through at least two adjacent ones of said compartments.

5. A conching machine for treating chocolate paste by kneading and mixing comprising
- a trough for containing said chocolate paste extending along a longitudinal axis from an input end to an output end, said trough having
  - compartments extending along said longitudinal axis;
- an input opening on said input end for inputting said chocolate paste;
- an output opening on said output end for outputting said chocolate paste;
- at least one partition wall being arranged transversely to said longitudinal axis and dividing said trough into said compartments of said trough, said partition wall comprising
  - at least one passage opening for said chocolate paste;
- at least two rotors with kneading elements each rotor being arranged within one of said compartments and having a rotational axis substantially parallel to said longitudinal axis; and
- motor means for driving said rotors;
- wherein at least one of said walls comprises a disc turning around one of said rotational axes and having at least one passage opening.

6. Conching machine as claimed in claim 5, wherein said disc is fixed to said rotor turning around said rotational axis.

7. Conching machine as claimed in claim 5, wherein at least one of said walls comprises at least two discs being arranged at least around two of said rotational axes.

8. Conching machine as claimed in claim 5, wherein said passage opening is located at the periphery of said disc.

9. A conching machine for treating chocolate paste by kneading and mixing comprising
- a trough for containing said chocolate paste extending along a longitudinal axis from an input end to an output end, said trough having
  - compartments extending along said longitudinal axis;
- an input opening on said input for outputting said chocolate paste;
- an output opening on said output end for outputting said chocolate paste;
- at least one partition wall being arranged transversely to said longitudinal axis and dividing said trough into said compartments of each trough, said partition wall comprising
  - at least one passage opening for said chocolate paste;
- at least two rotors with kneading elements each rotor being arranged within one of said compartments and having a rotational axis substantially parallel to said longitudinal axis; and
- motor means for driving said rotors;
- wherein at least two of said compartments have separate cooling circulations.

10. A conching machine for treating chocolate paste by kneading and mixing, comprising
- a trough for containing said chocolate paste extending along a longitudinal axis from an input end to an output end said trough having,
  - at least two compartments extending along said longitudinal axis;
- an input opening on said input end for inputting said chocolate paste;
- an output opening on said output end for outputting said chocolate paste;
- at least one shearing tool arranged adjacent to said output opening, said tool rotating around a tool axis being substantially transversal to said longitudinal axis;
- at least two rotors with kneading elements, each rotor being arranged within one of said compartments and having a rotational axis substantially parallel to said longitudinal axis, wherein at least part of said kneading elements of at least one of said rotors are recessed for allowing passage of said shearing tool.

* * * * *